Jan. 14, 1936.  A. R. PIERCE, JR  2,027,613
WIND ANGLE INDICATOR
Filed April 14, 1933   2 Sheets-Sheet 1
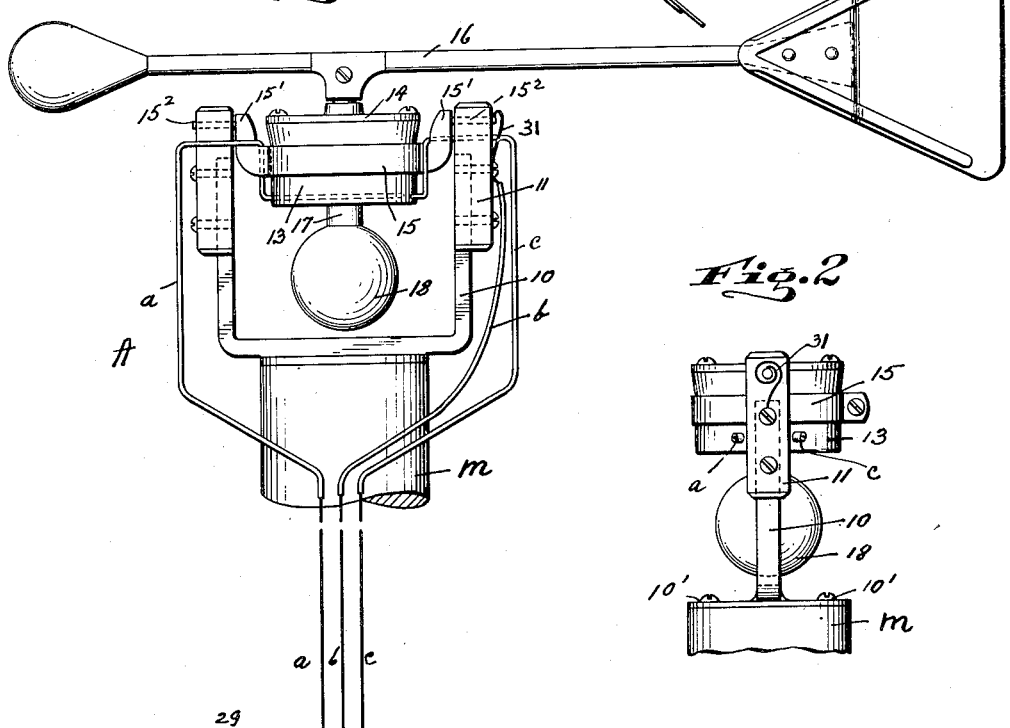

Jan. 14, 1936.   A. R. PIERCE, JR   2,027,613
WIND ANGLE INDICATOR
Filed April 14, 1933   2 Sheets-Sheet 2
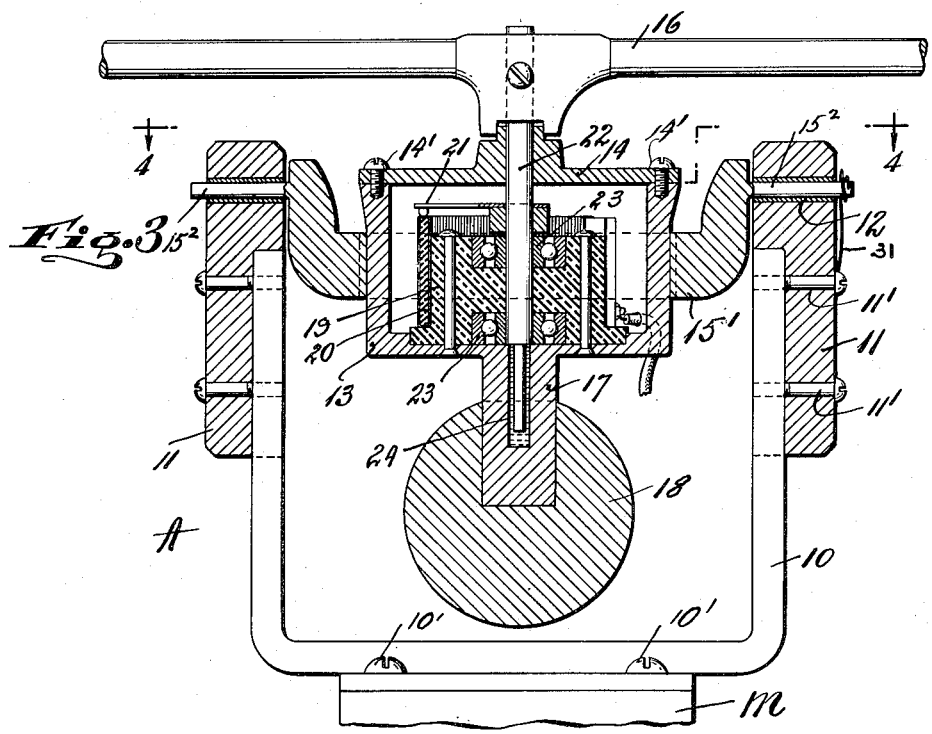
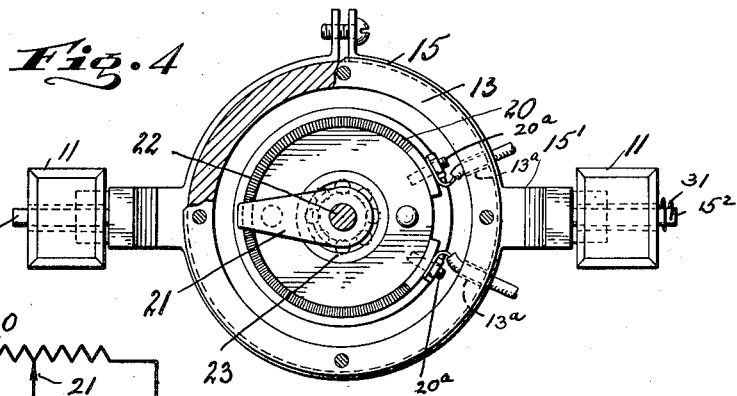
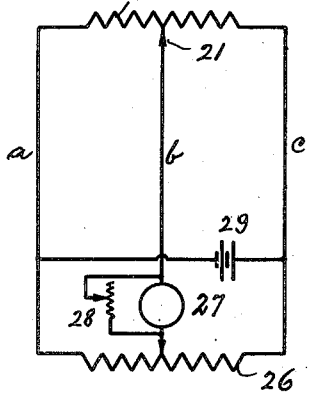
Albert R. Pierce Jr. INVENTOR.
BY Max␣␣Ordmann ATTORNEY.

Patented
Reissued Jan. 14, 1936

2,027,613

UNITED STATES PATENT OFFICE 2,027,613

WIND ANGLE INDICATOR

Albert R. Pierce, Jr., New Bedford, Mass.

Application April 14, 1933, Serial No. 666,097

4 Claims. (Cl. 177—351)

This invention relates to indicators and has for its main object to provide a wind angle indicating device which can be used on moving objects to indicate more particularly sailing vessels the angle between a given base line or course of the vessel and the apparent wind, also any momentary changes of that angle due to a change in direction of apparent wind or of base line acting either separately or simultaneously.

My invention substantially consists of an instrument provided with a wind controlled electric device including a branched circuit connected on the principle of a Wheatstone bridge to a circuit balance indicator, such as a galvanometer, which upon the departure from a given angle between base line and apparent wind by a wind controlled potentiometer, will effect a change of potential in the circuit, causing a deflection in the galvanometer from zero, which deflection will indicate the direction and magnitude of the change in angle.

The instrument is advantageously divided into two units, one to be fixed at a point suitable for measuring the angle between apparent wind and base line, the other at a point convenient for observation and control of instruments.

My invention will be more fully understood by reference to the accompanying drawings which form part of this specification and in which similar reference characters denote corresponding parts. These drawings show the invention as designed for marine use and are used here for explanatory purposes only.

Fig. 1 is an elevation of the instrument, the upper part being the device to be fixed to a point suitable for accurate determination of said angle and the lower part to any position convenient for observation and control of instruments;

Fig. 2 is a reduced similar elevation of the wind actuated unit shown at a right angle to that of Fig. 1;

Fig. 3 is an enlarged vertical section of said wind actuated unit;

Fig. 4 is a cross section on line 4—4 of Fig. 3;

Fig. 5 is a top plan view of a detail; and

Fig. 6 a diagrammatic view of the instruments constructed on the Wheatstone bridge principle.

Referring more specifically to the drawings, M denotes an object fixed in relation to base line such as the mast head of a sailing vessel. My instrument consists of two units A and B, the unit A being adapted to be applied to the mast head M and unit B fixed to a panel to be located in a position convenient for observation and control of the instruments.

The wind actuated unit A, comprises a substantially U-shaped frame 10 fixed to the mast head as at 10'. At its upper end, as at 11', this frame has attached to it blocks of wood or suitable bearing material which are formed with suitable horizontal bearings 12 for the suspension of an electric device to be controlled by the wind. The device comprises a casing 13 having a water-tight lid 14 fixed thereto as at 14'. By test it was found that considerable accurancy is gained by having the fore and aft plane of the wind actuated unit perpendicular to the water. Hence, to counteract heeling of the boat this casing is swung in a gimbal comprising a metal strap 15 tightly engaging the casing and formed with diametrically extending arms 15' having cylindrical ends $15^2$ journalled in the bearings 12. The casing is counterbalanced and to this end is provided centrally with a hollow extension 17 projecting downwardly from its bottom and having fixed to it a counter-weight 18. Mounted concentrically in and fixed to the bottom of the casing 13 is a cylindrical body 19 of insulating material on which is mounted an electrical resistance coil 20 which constitutes one of the potentiometers of the Wheatstone bridge circuit. The contact piece for said potentiometer is formed by a horizontal lever arm 21 fixed on a vertical spindle 22 which projects through said lid 14 and through the insulation body 19 in which it is rotatively mounted on ball bearings 23. The lower end of said spindle is extended to project downwardly through the bottom of said casing and be submerged in a mercury well 24 provided in the hollow extension 17. The upper end of said spindle which projects outwardly through said lid 14 carries an element 16 to be actuated by the wind, such as a wind vane, preferably one having a split tail 16' (Figs. 1 and 5). Of course, any method of mounting a potentiometer so that the rotating lever will contact the resistance may be used.

The unit B to be used on deck comprises the second potentiometer 26 of the Wheatstone bridge having suitable resistance. It also comprises a galvanometer 27 and a sensitivity control 28 for said meter. A battery 29 or other electrical source necessary for operation is connected at a convenient point to wires A and C.

The two potentiometers 20, 26 and the galvanometer 27 are connected together and to the battery 29 by a three wire cable $a$, $b$, $c$, in well known manner on the Wheatstone bridge principle as shown in the diagram of Fig. 6. The galvanometer 27 is a center type galvanometer, so that as long as the resistance ratios in both potentiometers are proper, the balance indicator will point to zero.

The sensitivity control 28 is a variable resistance shunted across the galvanometer as shown in Fig. 6 serving to provide for fine control of the galvanometer 27.

The three wires of the weather proof cable which connects the upper and lower units are connected to the potentiometers in the manner shown in the diagram Fig. 6. The casing 13 is provided with openings 13ª through which wires a and c are led to the terminals 20ª of the potentiometer 20. The third wire b is connected through frame 10 and member 11', hair spring 21 wound around one of the journals 15² (Fig. 1) making an electrical connection between 15² and frame 10. The frame 10, member 11', casing 13 and spindle 22 are of conductive material. Electrical contact between the casing 13 and the spindle 22 is effected through the mercury in the well 24.

The mode of operation of my instrument is as follows:—

Upon determining a course according to destination, the sails are set for the existing wind conditions. The dial 26' of the potentiometer 26 on the panel 30 is rotated until the galvanometer 27 reads an average zero. If the momentary variations of the wind direction are of too great a magnitude the sensitivity control is adjusted to damp the oscillations of said galvanometer. The dial 26' which has been calibrated then indicates the angle of the apparent wind in respect to the base line.

Suppose for instance that the ship is close hauled and tacking or beating against the wind, the course of the vessel would be such so that should the wind hold true the vessel would travel thru the water at its best speed with reference to pointing into the wind as high as possible. However, the wind very seldom holds true but shifts its direction from one side to the other quickly and without warning. The instant that the wind shifts, it will be indicated by a deviation of the pointer in the dial 27 from the zero position. If the change in wind be favorable, the skipper will at once point the boat higher to take advantage of the shift in the wind, whereas if the shift of the wind be further around to the leeward, the skipper will keep the vessel off so that the sails will remain full and the speed of the vessel maintained. This enables the skipper to more accurately follow the wind and take all the advantages thereof. On the other hand, if the sailing course can be laid and the sailing vessel have a direction so that it is off the wind then the setting of the galvanometer will again be made zero and any shift in the direction of the wind will be taken advantage of by a shifting of the sails, that is either letting off or hauling in the sheet so that advantage may be taken of the wind on such course and moving the sails rather than moving the vessel. By this method the very best advantage may be taken of the changes in direction of the wind, which are frequently occurring.

Since various changes may be made in the construction of my instrument without departing from the principle of my invention, I do not wish to restrict myself to the details described and shown.

What I claim is:—

1. In combination with a sailing vessel, two units one positioned on the upper part of the mast and the other unit on the deck, said deck unit including an indicator, a vane movable by the wind, means for transmitting said vane movements to said mast unit, means responsive to said movement in the mast unit for setting up movement in the indicator of said deck unit, and means for adjusting the deck indicator to a reference point, whereby the shift of the wind relative to the direction of the vessel may be observed on deck by the skipper and action may be had to take advantage thereof.

2. In combination with a sailing vessel, an electrical instrument divided into two units, one of said units being applied at the upper part of the mast and the other on deck, said two units each including a potentiometer having movable contact arms, a vane movable by the wind, the contact arm of the mast potentiometer being connected to said vane and moved thereby and the movable contact arm of the deck unit potentiometer being manually controlled, said deck unit including a circuit balance indicator, said potentiometers, their movable contact arms and said circuit balance indicator being connected on the principle of a Wheatstone bridge with a power source so that a difference of potential across the circuit balance indicator by unbalance of the bridge, resulting from movement of said mast contact by the wind, will cause a deflection in said indicator which will denote the magnitude and direction of the relative shift of the wind with reference to the direction of the vessel, whereby to enable the skipper to act to take advantage of the change in the wind.

3. The method of handling a sailing vessel having a vane movable by the wind positioned on the upper part of the mast and an indicator on deck movable in response to said vane and adjustable to a reference point indication, which consists in setting a course, adjusting said indicator and then observing changes in the relative direction of the wind as shown in said indicator and shifting the course of the vessel or sails thereof to take advantage of the change in the wind as shown by said indicator.

4. In combination with a sailing vessel, a vane movable by the wind positioned up the mast, an indicating unit on deck having a movable direction indicating member and a relatively stationary reference mark, means to transmit movements of the vane to said indicating member to move it relatively to said reference mark, whereby a shift of wind relative to the direction of the vessel may be observed on deck by the skipper and action may be had to take advantage thereof.

ALBERT R. PIERCE, Jr.